United States Patent [19]

Olsson et al.

[11] Patent Number: 4,565,282

[45] Date of Patent: Jan. 21, 1986

[54] STORING INSTALLATION FOR CARRYING A NUMBER OF PILED HELICALLY EXTENDING TURNS OF AN ENDLESS CONVEYOR BELT

[75] Inventors: Lennart Olsson, Nyhamnsläge; Gerald Heber, Helsingborg, both of Sweden

[73] Assignee: Frigoscandia Contracting AB, Helsingborg, Sweden

[21] Appl. No.: 554,345

[22] Filed: Nov. 22, 1983

[30] Foreign Application Priority Data

Nov. 26, 1982 [SE] Sweden ................................ 8206759

[51] Int. Cl.⁴ .............................................. B65G 21/18
[52] U.S. Cl. ..................................... 198/778; 198/833
[58] Field of Search ............... 198/778, 833, 328, 841, 198/842

[56] References Cited

U.S. PATENT DOCUMENTS

| 617,779 | 1/1899 | Seeberger | 198/328 K |
| 1,153,845 | 9/1915 | Henneuse | 198/842 X |
| 3,682,295 | 8/1972 | Roinestad | 198/833 |
| 3,938,651 | 2/1976 | Alfred et al. | 198/778 |
| 4,036,352 | 7/1977 | White | 198/778 |
| 4,434,884 | 3/1984 | Kettle | 198/328 |
| 4,450,153 | 5/1984 | Le Cann et al. | 198/778 |

Primary Examiner—Joseph E. Valenza
Assistant Examiner—Michael Stone
Attorney, Agent, or Firm—Shapiro and Shapiro

[57] ABSTRACT

A storing installation for carrying a number of helically extending turns of an endless conveyor belt laid upon one another in a pile, where the various belt turns in the pile are supported by one another, comprises two endless chains which are arranged under the belt pile, support the two edge portions of the belt and are carried by supports, said chains being each adapted, after the ingoing or outgoing lower part of the conveyor belt, to follow the belt in its rise throughout a complete revolution, whereupon it travels in a direction opposite to the rise of the conveyor belt in a path beside said revolution so as to form the endless chain.

7 Claims, 10 Drawing Figures

STORING INSTALLATION FOR CARRYING A NUMBER OF PILED HELICALLY EXTENDING TURNS OF AN ENDLESS CONVEYOR BELT

The present invention relates to a storing installation for carrying a number of helically extending turns of an endless conveyor belt, laid upon one another in a pile, where the various belt turns in the pile are supported by one another especially by means of spacing members arranged adjacent the edges of the belt, said storing installation comprising an endless conveyor unit which both carries and drives the pile of helically extending conveyor belt turns. The object of the invention is to eliminate the disadvantages of the prior-art storing installations of this type which have not been able to carry the pile throughout a continuous complete revolution due to the ingoing or outgoing lower part of the conveyor belt. Characteristic of the storing installation according to the invention is thus that it comprises preferably two endless chains which are arranged under the belt pile, support the two edge portions of the belt and are carried by supports, said chains being each adapted, after the ingoing or outgoing lower part of the conveyor belt, to follow the belt in its rise throughout at least one complete revolution, whereupon it travels in a direction opposite the rise of the conveyor belt in a path beside said revolution so as to form the endless chain.

The invention will be described in more detail below with reference to the accompanying drawings which illustrate by way of example an embodiment of the storing installation in cooperation with the endless conveyor belt and in which.

Figure 1:
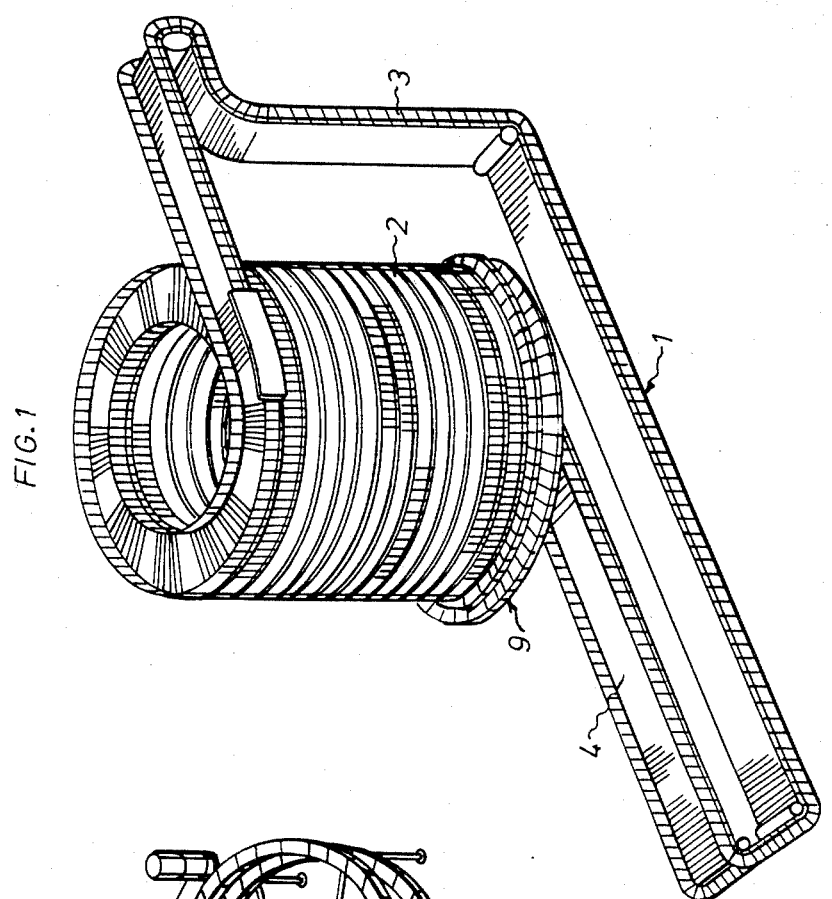
FIG. 1 is a perspective view of the storing installation together with the endless conveyor belt carried thereby.

The conveyor belt 1 is adapted along part of its length to follow a path consisting of a number of helically extending turns laid upon one another in a pile 2. The conveyor belt 1 is endless and therefore it will travel in a path 3 from the top end of the pile 2 to the bottom end thereof where the ingoing or outgoing part is designated by 4. In the illustrated embodiment the conveyor belt 1 in the pile 2 is to be fed from bottom to top but also the reverse condition is conceivable.

As will already be apparent from the above description the conveyor belt 1 is so designed that it can run both straight and in curves. It consists of the bottom part 5 and of links 6 fitted at the ends thereof and constituting the two sides of the belt 1, said links 6 being adjustable relative to staff-like members included in the bottom part 5 and extending in transverse direction. The links 6 positioned on or adjacent the edge portions 7 and 8 of the conveyor belt 1 are designed as spacing members which are adapted to bear with their upper edge portions against the lower edge portions of the links 6 designed as spacing members on the two sides of overlying turns of the endless conveyor belt 1 in order to permit carrying of the underlying belt turn in the belt pile.

The pile 2 of the superposed, helically extending turns of the endless conveyer belt 1 is carried by the storing installation 9. This comprises two endless chains 12 and 13 which are arranged under the belt pile 2, support the two edge portions 7 and 8 of the belt 1 and are carried by supports 10 and 11. Each of the chains 12 and 13 is adapted, after the ingoing lower part 4 of the conveyor belt 1, to follow the belt 1 in its rise through at least one complete revolution. After this the chain 12 and 13 respectively travels in a direction opposite the rise of the conveyor belt 1 in a path beside said revolution so as to form the endless chain.

Figure 2:
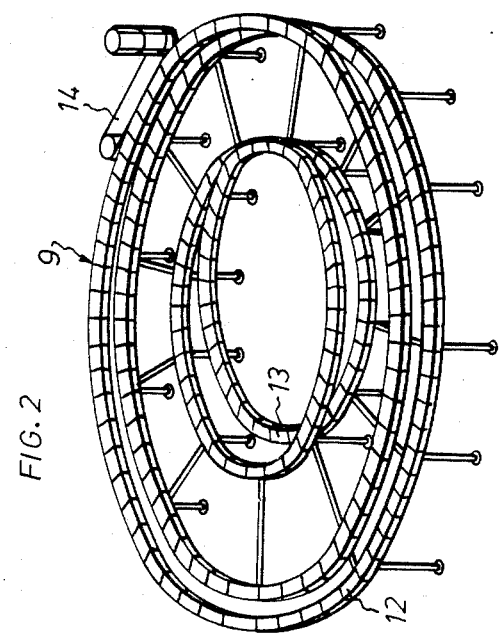
FIG. 2 is likewise a perspective view showing on a slightly larger scale the storing installation with a drive engine.

As appears from FIG. 2 the chain 12 is driven and constitutes itself a drive for the endless conveyor belt 1. The drive 14 consists of an engine-driven endless chain which bears along part of its length against the chain 12 where it engages teeth 15 or the like arranged on the chain 12.

The links on the chain 13, which is adapted to support the inner edge portion 8 of the belt pile 2 inside the spacing means, are provided on their upwardly facing sides with abutments 16 against which the inner edge of the conveyor belt is adapted to bear during piling. In other words, the abutments 16 define the curve shape of the pile 2 which need not necessarily be circular but may as well be oval.

Figure 3:
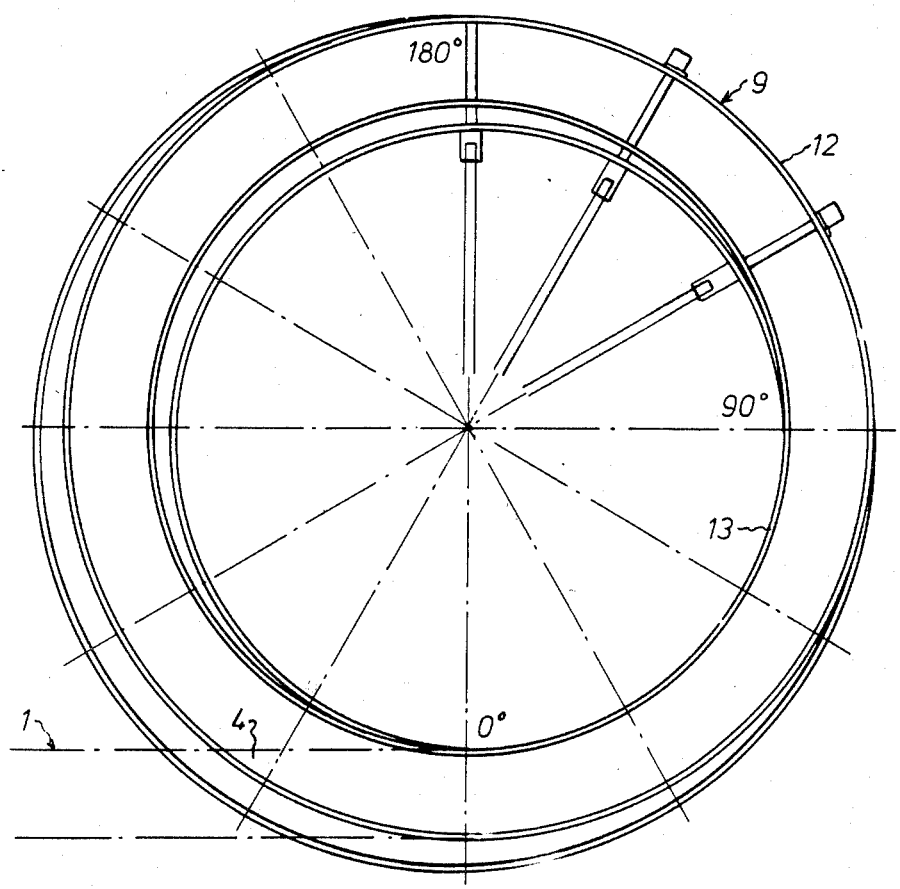
FIG. 3 is a top plan view showing the storing installation on a larger scale.
Figure 4:
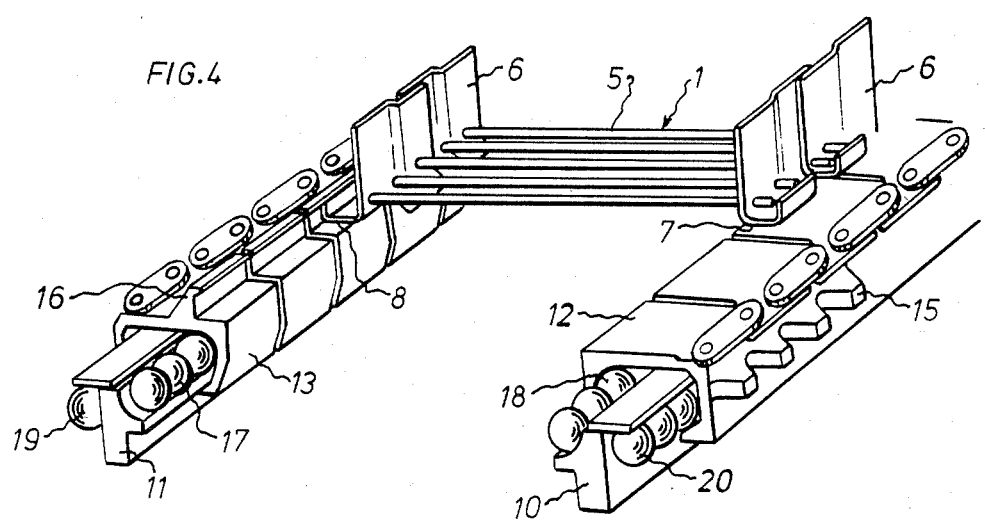
FIG. 4 is a perspective view showing on a still larger scale part of the conveyor belt in cooperation with part of the storing installation.
Figure 5:
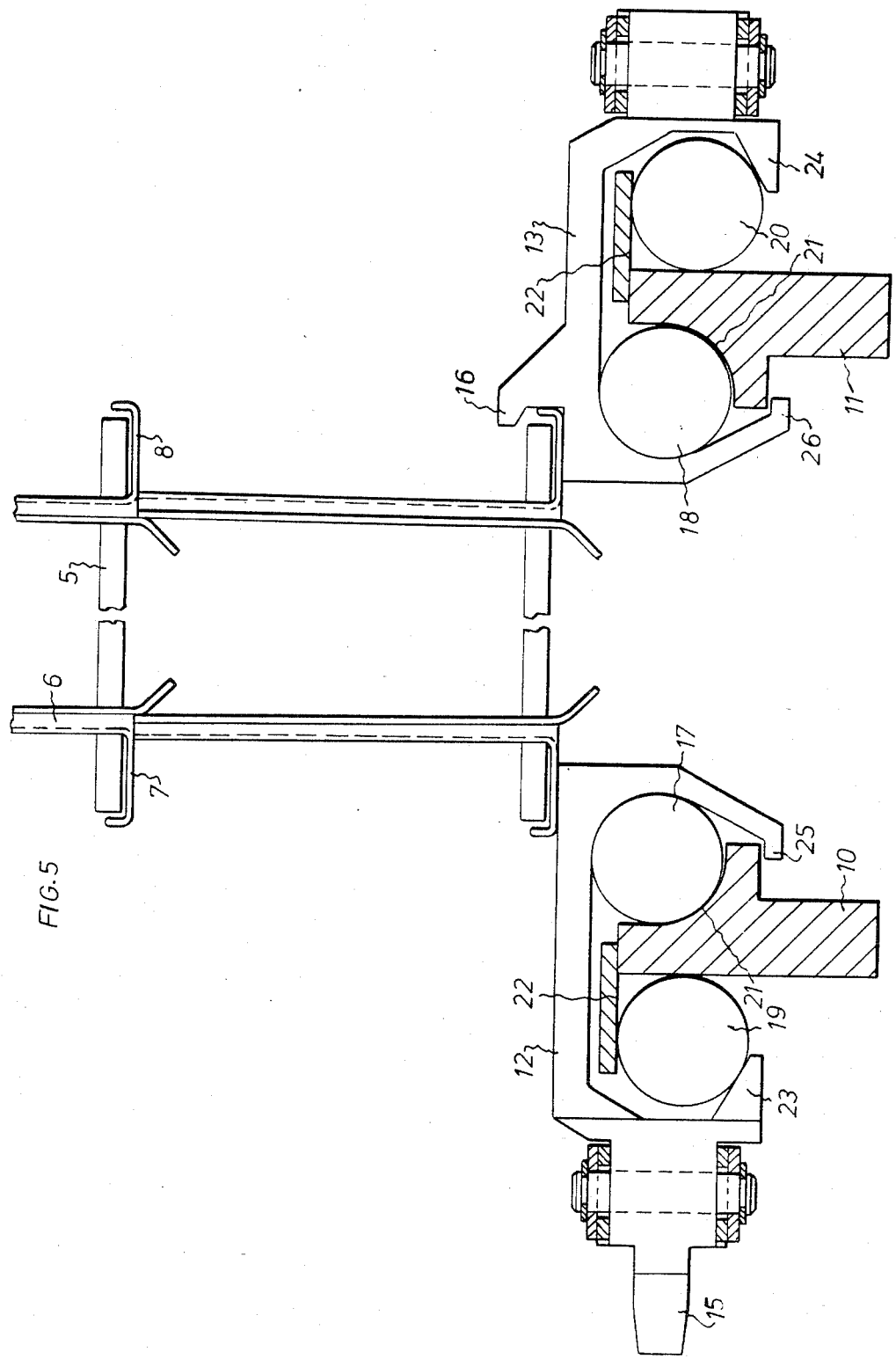
FIG. 5 shows on an even larger scale a cross-section of the storing installation and the conveyor belt cooperating with it.
Figure 6:
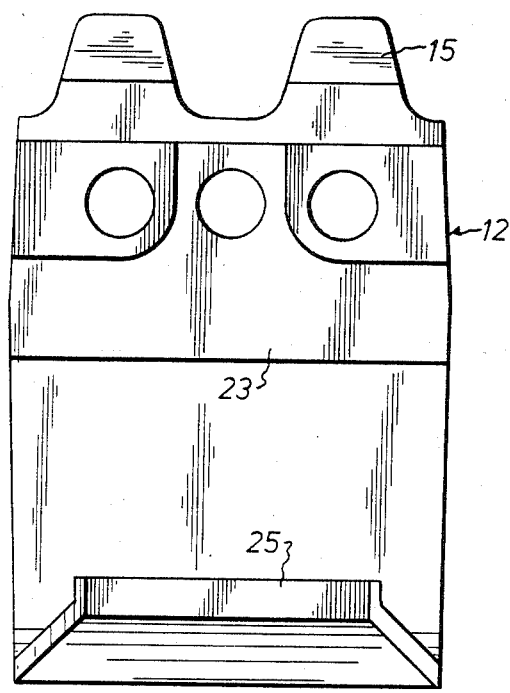
FIGS. 6–9 show links as viewed from below and in cross-section included in the two chains belonging to the storing installation.
Figure 7:
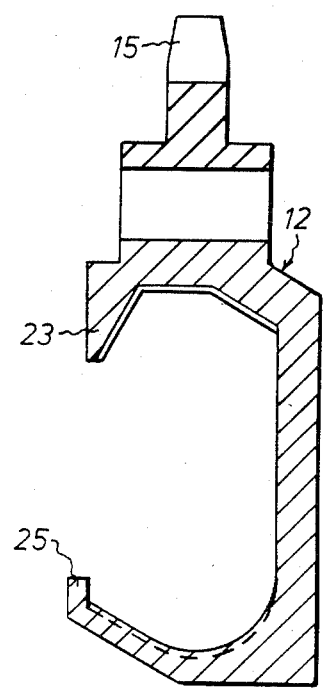
Figure 8:
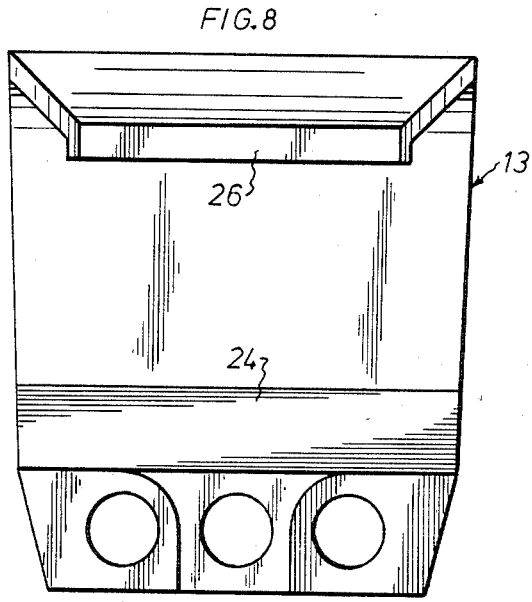
Figure 9:
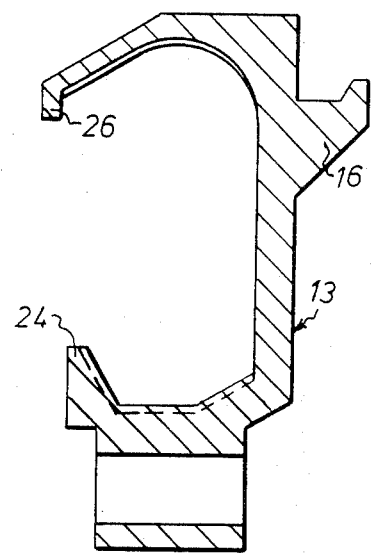

As is best shown in FIG. 3 the chain 13 which supports the inner edge portion 8 of the belt pile 2 and the upwardly facing side of which is provided with the abutments 16, is adapted to support the belt pile 2 from the moment the ingoing part 4 of the belt 1 assumes curve shape until it has passed a full revolution. According to the drawing it has covered one revolution and 90°. The chain 12 supporting the outer edge portion 7 of the belt pile 2 is adapted to start supporting the belt pile 2 outside the spacing means later than the chain 13. It also ceases to support the belt pile 2 later than the chain 13. It is not until the lower turn has moved through about 90° in a curve that the chain 12 starts supporting the belt pile 2 while it ceases to support the belt pile 2 after a revolution and 90°. The two chains 12 and 13 are thus adapted simultaneously to support the belt pile 2 throughout a complete revolution.

Arranged between the chains 12 and 13 and their supports 10 and 11 respectively is at least one endless ball series 17 and 18 respectively to facilitate displacement of the chain along the support.

The chains 12 and 13 supporting the conveyor belt 1 are eccentrically loaded by the edge portions 7 and 8 respectively of the conveyor belt 1 at least when the chain goes into and out of engagement with the edge portion. To prevent lateral tipping of the chain 12 and 13 due to the eccentric load each chain cooperates with at least one other endless ball series 19 and 20 respectively which is arranged between chain and support so as to eliminate lateral tipping of the supports 10 and 11. There are two roll ways 21 and 22 for the endless ball series, is one roll race 21, which faces the supported edge portion of the conveyor belt 1, is turned upwards and is intended for the ball series facilitating displacement of the chain, and another roll race 22 which faces away from the conveyor belt 1, is directed downwards and is intended for that ball series which prevents lateral tipping of the chain and against which a bottom flange 23 and 24 of the chain 12 and 13 bears.

The links of the two chains 12 and 13 are of generally U-shaped cross-section with upwardly facing web, the opposite flanges 23, 25 and 24, 26 respectively being provided on the free ends of the U-legs. To this effect the ball series 19 and 20 preventing lateral tipping of the chains are adapted to bear exactly on the inside of one flange 23 and 24 respectively.

Figure 10:
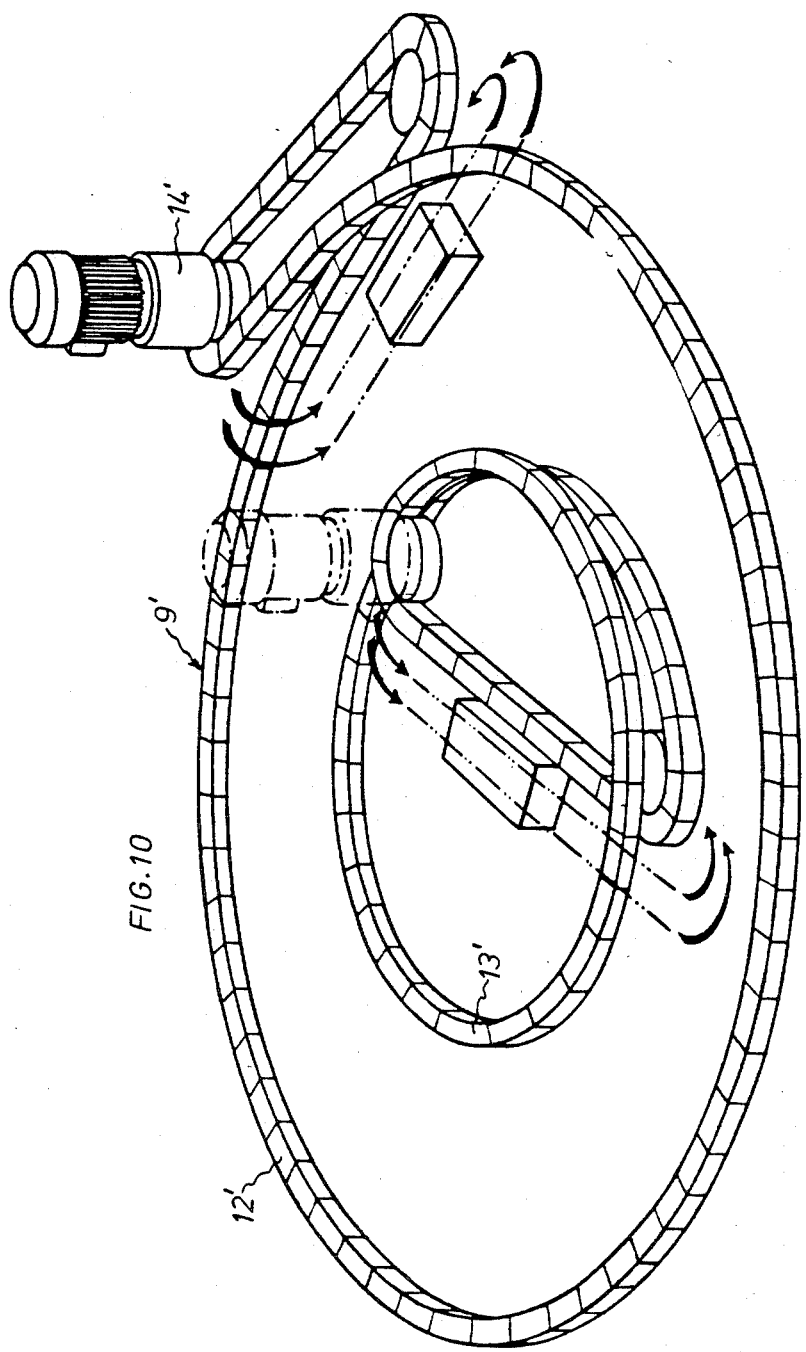
FIG. 10 shows a modified embodiment of the storing installation, in analogy with FIG. 2.

As compared to the storing installation 9, illustrated in perspective in FIG. 2, where the return parts of the two chains 12 and 13 running in a direction opposite to the rise of the conveyor belt 1 substantially follow the parts of the chains 12 and 13 supporting the conveyor belt 1, the return parts of the two chains 12' and 13' according to FIG. 10 run in considerably narrower paths. Add to this that at least the chain 12', and preferably also the chain 13', is driven by an engine 14' and therefore no further endless chain is required for the driving operation. The arrows in FIG. 10 are to show that the balls cooperating with the chains 12' and 13' need not constantly follow the chains but can be directly transmitted from the highest to the lowest supporting points thereof. This reduces the number of balls required. This arrangement makes it also possible easily to replace and exchange the balls at the same time as it is possible to feed the balls so that they will always be situated at a distance from each other.

The invention is not restricted to that described above and shown in the drawings but may be modified within the scope of the appended claims.

What we claim and desire to secure by Letters Patent is:

1. Supporting installation for carrying a number of helically extending turns of an endless, sidewise collapsible conveyor belt, laid upon one another in a pile, where the various belt turns in the pile are supported by one another especially by means of spacing members arranged adjacent the belt edges, said installation comprising an endless conveyor unit which both carries and drives the pile of helically extending conveyor belt turns, wherein the conveyor unit comprises:
   (A) two endless chains which are arranged under the belt pile and support the two edge portions of the belt throughout at least one complete revolution,
   (B) a support under each of said endless chains and having an upwardly directed rolling race, and
   (C) at least one endless rolling element series arranged between each chain and the rolling race of its support, and
   wherein each of said chains comprises links forming with its support a channel enclosing rolling elements in one of said rolling element series and extending at least through the support length of the belt.

2. Supporting installation as claimed in claim 1, wherein the links of at least one chain are provided with teeth or the like for driving engagement therewith.

3. Supporting installation as claimed in claim 2, wherein the links of a first of said chains are provided on upwardly facing sides thereof with abutments against which one edge of the conveyor belt is adapted to bear during piling.

4. Supporting installation as claimed in claim 3, wherein said first chain supports the inner edge portion of the belt pile and is adapted to support the belt pile from the moment the ingoing part of the belt assumes curved shape until it has traveled a full revolution and the remaining chain supports the outer edge portion of the belt pile, is adapted to start supporting the belt pile later than the first chain and to cease supporting the belt pile later than the first chain.

5. Supporting installation as claimed in claim 1, wherein at least one of said chains is eccentrically loaded by an edge portion of the conveyor belt and cooperates with at least one other endless rolling element series arranged between said one chain and its support so that lateral tipping of said one chain will be prevented in spite of the eccentric load.

6. Supporting installation as claimed in claim 5, wherein the last-mentioned support also includes a downwardly directed rolling race for the other endless rolling element series, the links of said one chain having a bottom flange which bears against the rolling elements of said other rolling element series.

7. Supporting installation as claimed in claim 5, wherein the links of at least said one chain are generally U-shaped in cross-section with an upwardly facing web, opposite flanges being provided at the free ends of the U-legs, the rolling elements of said other rolling element series being adapted to bear on the inside of one of said flanges.

* * * * *